UNITED STATES PATENT OFFICE.

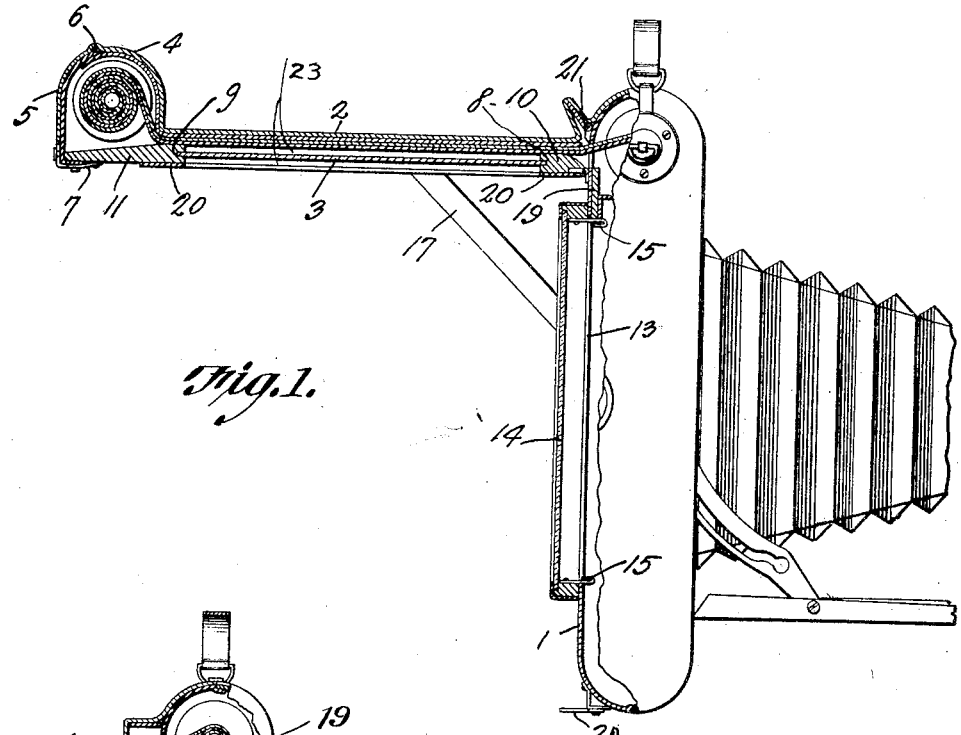
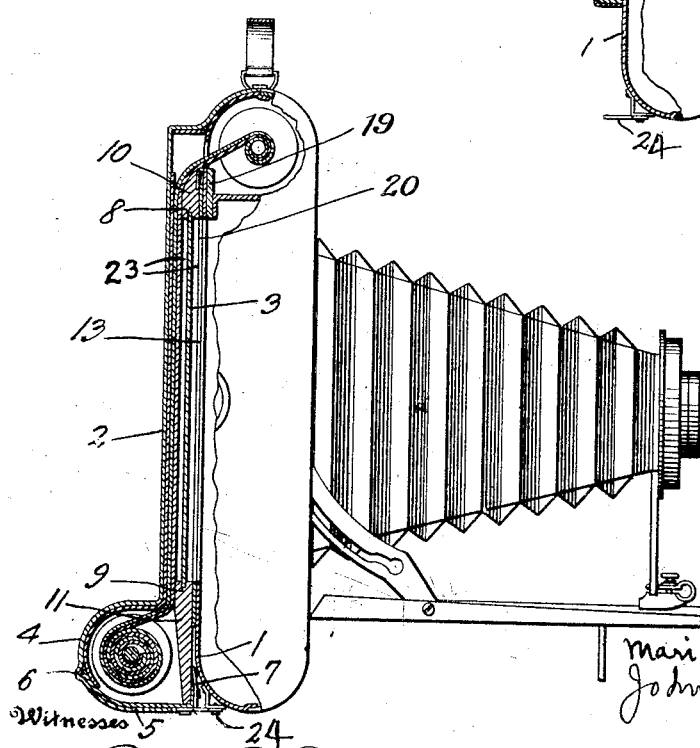

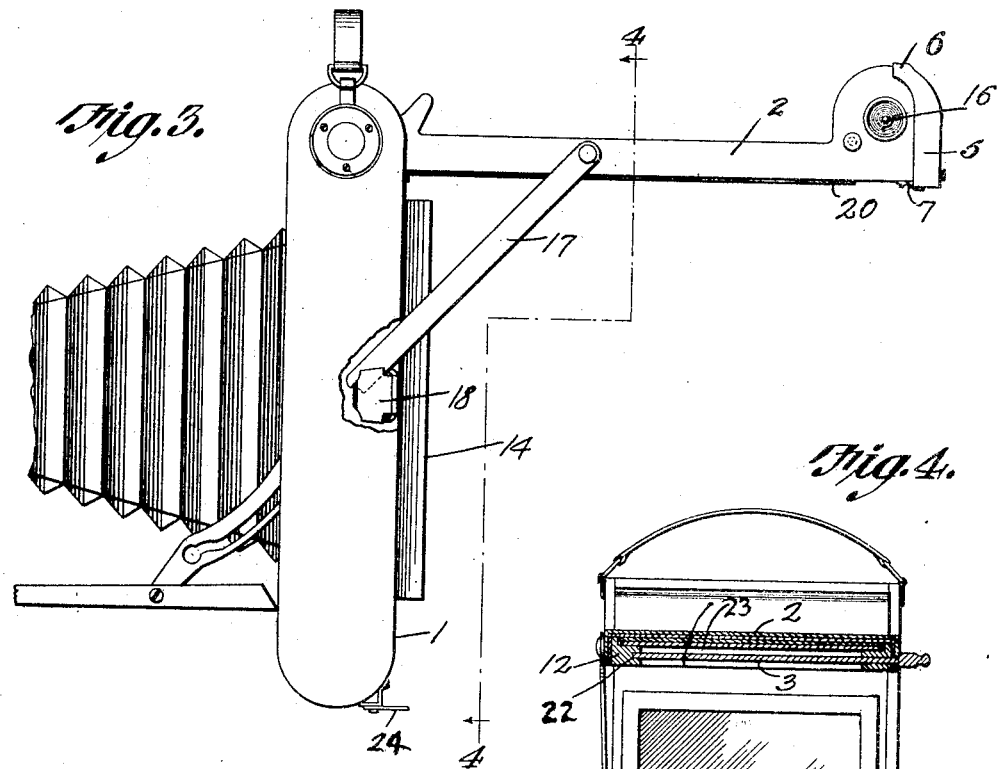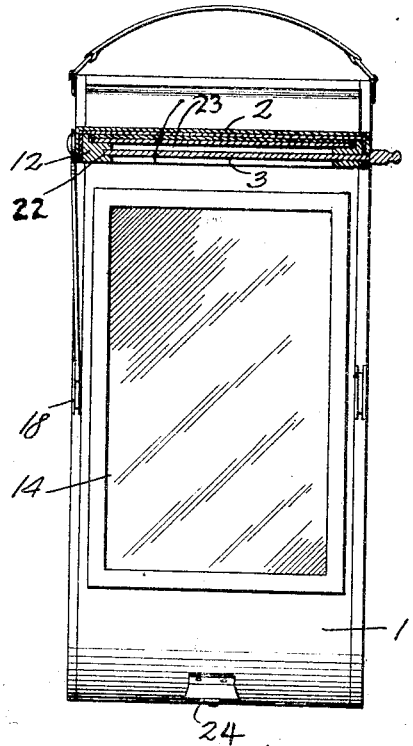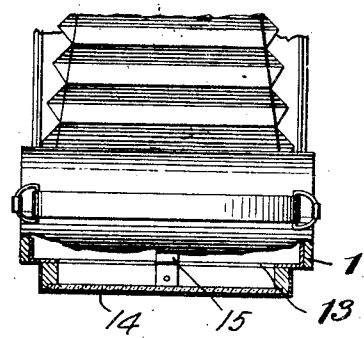

MARION A. WORTHEN AND JOHN E. WORTHEN, OF CLE ELUM, WASHINGTON.

FOCUS FILM ATTACHMENT.

1,184,404.   Specification of Letters Patent.   Patented May 23, 1916.

Application filed February 24, 1915. Serial No. 10,367.

*To all whom it may concern:*

Be it known that we, MARION A. WORTHEN and JOHN E. WORTHEN, citizens of the United States, residing at Cle Elum, in the county of Kittitas and State of Washington, have invented a new and useful Focus Film Attachment, of which the following is a specification.

Our invention relates to a novel focusing mechanism for film cameras, the object of the invention being to enable the operator to bring out the features as well on a cartridge film as can be done on a plate camera.

The especial object of the invention is to provide a mechanism adapted for ready attachment to almost any cartridge or roll film camera; and to permit of such cameras being loaded and unloaded in daylight.

A further object is to provide a device which may be readily attached to any roll film camera without requiring any reconstruction of the camera to permit of its use and which is easily and simply operated.

In the accompanying drawings, Figure 1 is a sectional view of our invention with the attachment in raised position, the camera being shown partly in elevation; Fig. 2 is a similar view with the focus film attachment in lowered or closed position; Fig. 3 is a side elevation of the invention, a portion of the camera being broken away to show the catch; Fig. 4 is a view on line 4—4 of Fig. 3; Fig. 5 is a partly sectional and partly plan view looking down on the top of the camera.

Like characters of reference indicate like parts throughout the several views.

Referring to the drawings illustrative of the invention, it will be observed that we provide a member 1 corresponding to the ordinary camera back except that it has an opening 13 of rectangular shape. Camera back member 1 is removable in the customary manner for the insertion of the film. We provide a novel shutter slide holder 2, which is pivotally attached at its upper end to the upper end of camera back member 1. It is slotted for the insertion of a shutter slide 3, as illustrated. At the lower end of shutter slide holder 2 is a film chamber 4, having a door 5, pivoted to the chamber at 6, and adapted to be fastened by catch 7 in closed position. Winding studs or pins 16 of usual construction are provided, adapted to engage in the ends of and support the film spool when inserted in chamber 4, these studs or pins being slidable within a limited range.

Shutter slide 3 is mounted with its top and bottom edges projecting into slots 8 and 9 in members 10 and 11, respectively, as shown in Fig. 2, and into slot 22 in member 12, as shown in Fig. 4. Consequently the shutter slide 3 wholly covers opening 23 in shutter slide holder 2. Openings 13 and 23 substantially correspond in size and shape. In opening 13 in camera back member 1 is mounted a removable ground glass member 14, which is retained in place by suitable catches 15 frictionally engaging its edges, as shown in Fig. 1. A side arm 17 having a notched end adapted to engage a fastener 18, as shown in Fig. 3, is provided to support slide holder 2 in raised position. Attached to the inner portion of member 1, below film slot 21 is a suitable protecting strip 19, of felt or the like, as shown in Fig. 1. Similar protecting strips 20 are mounted in a similar relation on shutter slide holder 2 and entirely surrounding opening 23, to insure the satisfactory adjustment of the device when closed. A suitable latch 24 fastens the attachment in closed position, as shown in Fig. 2.

In operation, a camera with our attachment is loaded as follows: Catch 7 is released and door 5 opened for the insertion of the film roll in film chamber 4. Shutter slide 3 is withdrawn from the device. About three inches of film may be unrolled from the film roll. The end of the film is inserted through slot in bottom of film chamber (back of member 11), black side down. When film appears in shutter opening 23, the film roll is placed in film chamber 4, winding stops are pressed into place to engage the spool, and door 5 is closed and fastened. The film may be slid along the back of the attachment with the fingers, through opening. Shutter slide may next be inserted in place, the back of the attachment lowered and fastened to member 1 by catch 24. To place the attachment on camera when loaded, place empty reel in upper end of camera. Start end of film which extends out of opening in slot in empty reel. Turn winder until No. 1 exposure appears in red glass (which is located in upper left hand corner of shutter slide holder 2 in a position corresponding in location to that in the ordinary camera back.) To focus the film, unfasten catch 24 and raise the attachment to the position illustrated in Fig. 1 and prop in place by means of side arm 17. Insert ground glass 14 as illustrated in Figs. 1 and 5. Open the lens shutter and focus the object until it appears clear in ground glass member 14. Then close lens shutter, remove ground glass 14, lower member 2, fasten with latch 24, and set lens shutter to the desired time. The picture is then ready to be taken. When the exposure has been made, insert shutter slide 3 so as to close opening 23 to exclude light from the film, and turn winder until No. 2 exposure appears in the red glass. When shutter slide 3 is inserted in the shutter slide holder 2, the attachment can be raised at any time to the horizontal position, as shown in Fig. 1, to focus. But the shutter slide holder 2 must be lowered and fastened, as shown in Fig. 2 and the shutter slide 3 withdrawn from the attachment when the exposure is made to obtain the picture. The front lens must be closed each time before removing shutter slide.

The invention may be adapted to practically any camera using a cartridge film, and will enable the operator to bring out details as well on such a camera as on a plate camera.

What we claim is:

1. A film focusing attachment adapted to be readily attached to a roll film camera comprising a detachable camera back having a focusing opening therein, means pivotally attached to the aforesaid camera back for holding a film and film spool and having a corresponding focusing opening, a shutter slide member adapted to be inserted in the opening to exclude light from the film, and means for retaining the film-holding means in raised or lowered positions.

2. A readily detachable film focusing attachment comprising a readily removable camera back member having an opening therein, means adjustably attached to the camera back having a film chamber at one end thereof and a passage extending longitudinally of said means, a shutter slide adapted to be inserted in said means to exclude light from the film, a ground glass member removably mountable in the camera back, and means for retaining the film-holding means in raised or lowered positions.

3. A film focusing attachment adapted to be readily attached to a roll film camera comprising a camera back member having an opening therein, a ground glass member removably mountable in the opening and having means for retaining it in engagement with the camera back, shutter-slide and film holding means pivotally attached to the camera back member and a shutter slide adapted to be inserted over an opening in the camera back member to exclude light from the film, substantially as set forth.

4. A detachable film focusing attachment comprising a readily detachable camera back member having a focusing opening therein, a combined shutter-slide and film holding member having a pivotal attachment to the upper end of said camera back member, means for holding said members in or out of alinement with each other, the shutter slide being adapted to exclude light, focusing means removably mountable in the camera back member, and a shutter member, for the purposes set forth.

5. A detachable film focusing attachment having a readily detachable camera back member having a focusing opening therein, a shutter slide holder pivotally attached to the end of the aforesaid camera back member, means for retaining it in either parallel or angular relation to the said member, a shutter slide adapted to be inserted to exclude light from the film, film-holding means, and a ground glass member mountable in the opening in the camera back member.

6. A detachable film focusing attachment comprising a camera back member adapted to be readily attached to a camera of ordinary construction, said member having an opening to receive a ground glass, a ground glass member adapted to be fastened in said opening, a combined shutter slide and film holding means pivotally attached at its upper end to the upper end of the camera back member, and having an opening for the exposure of the film strip, means for retaining a shutter slide in superposed relation to the film strip to exclude light therefrom during the focusing of the object on the ground glass member, and means for mounting the film roll and for removing same, substantially as set forth.

In testimony whereof we hereunto affix our signatures in the presence of two witnesses.

MARION A. WORTHEN.
JOHN E. WORTHEN.

Witnesses:
ARTHUR J. BARTON,
EMIL SCHWEIGHART.